March 14, 1972  R. S. REMBERT ET AL  3,649,724
METHOD OF FORMING A PAD
Filed Nov. 3, 1969  3 Sheets-Sheet 1
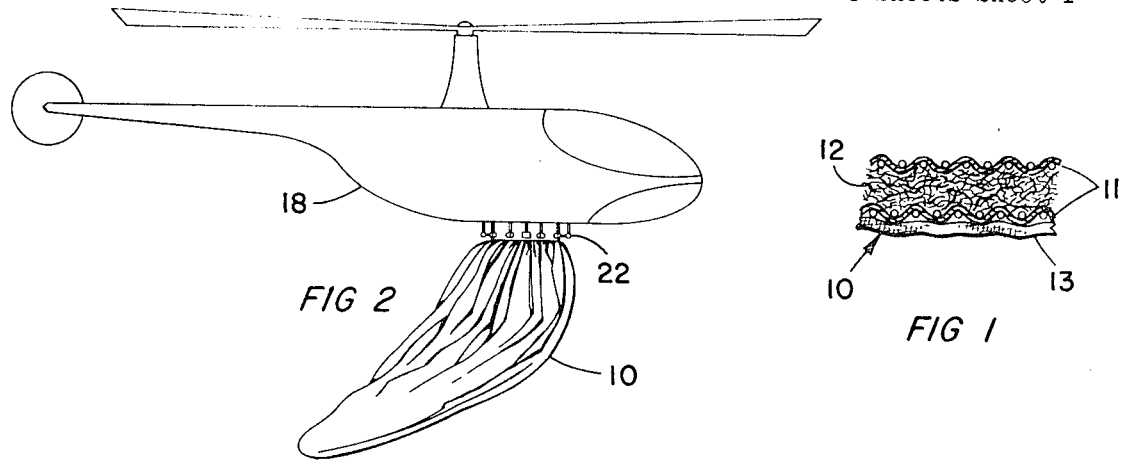
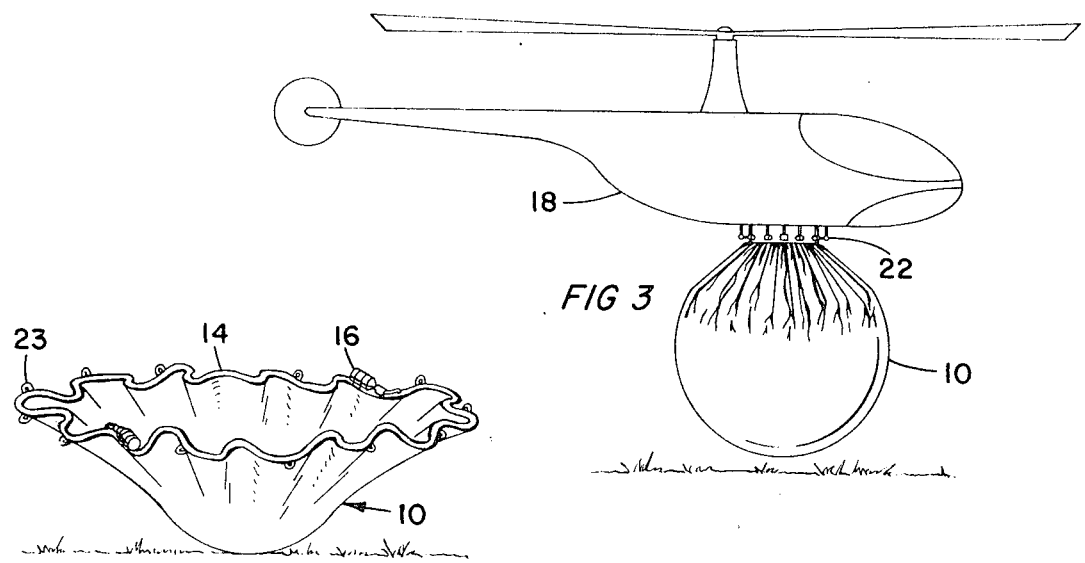
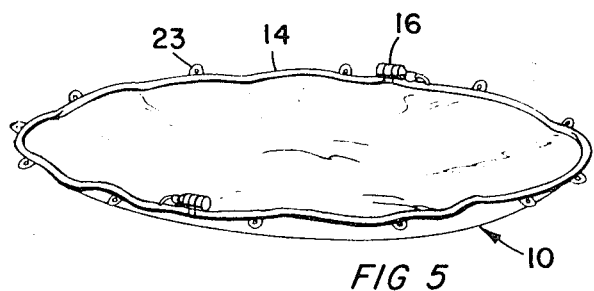
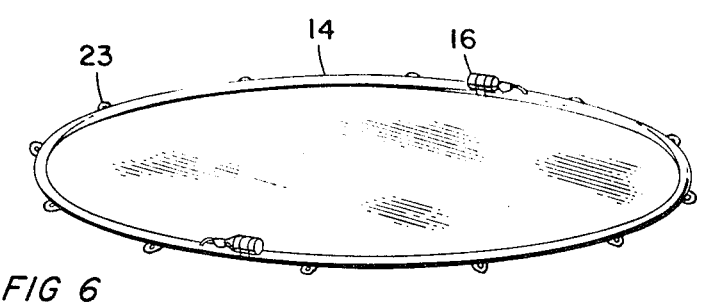
RUSSELL S. REMBERT
GERALD F. THOMAS
INVENTORS
BY James M. Cato
ATTORNEY March 14, 1972   R. S. REMBERT ET AL   3,649,724
METHOD OF FORMING A PAD Filed Nov. 3, 1969   3 Sheets-Sheet 2

RUSSELL S. REMBERT
GERALD F. THOMAS
INVENTORS

BY *James M. Cate*
ATTORNEY

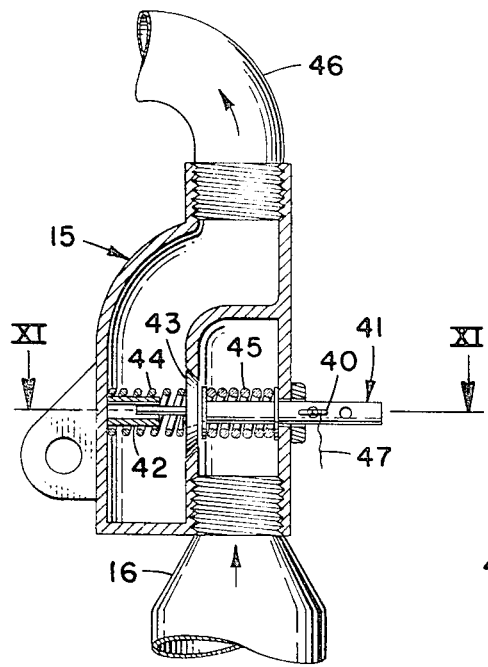
FIG 8
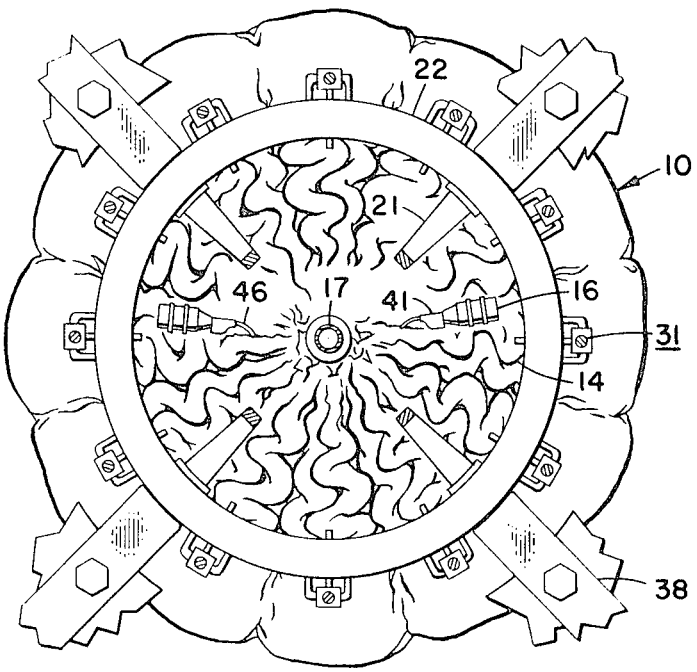
FIG 9
FIG 10
FIG 11
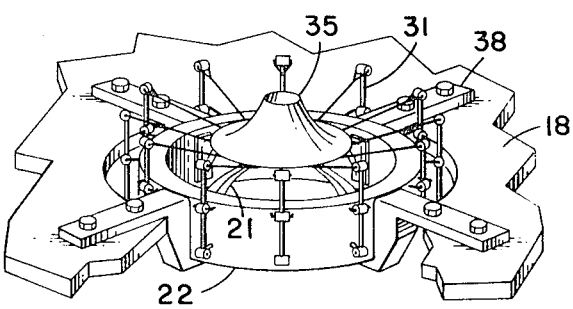
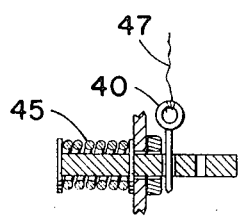
RUSSELL S. REMBERT
GERALD F. THOMAS
INVENTORS
BY James M. Cate
ATTORNEY United States Patent Office 3,649,724
Patented Mar. 14, 1972

1

3,649,724
METHOD OF FORMING A PAD
Russell S. Rembert, Dallas, and Gerald F. Thomas, Arlington, Tex., assignors to LTV Aerospace Corporation, Dallas, Tex.
Filed Nov. 3, 1969, Ser. No. 873,290
Int. Cl. B29c 13/00
U.S. Cl. 264—22
15 Claims

ABSTRACT OF THE DISCLOSURE

A method of conveniently forming a supporting pad is accomplished by impregnating a fibrous mat with a curable plastic formulation and transporting the impregnated mat to a desired site, where it is cured. The impregnated mat is gathered into the form of a deflated balloon for transport to the site and then inflated at the site to ensure that the mat is efficiently deployed. Additionally, the mat is stretched to a substantially flat configuration at the site by the inflation of a closed tube extending peripherally of the mat.

This invention relates to the formation of supporting pads and, more particularly, to a method of forming a pad in a remote area for supporting VTOL/VSTOL aircraft and the like.

The use of VTOL/VSTOL aircraft (aircraft capable of vertical take-off, and take-off in short distances) in remote areas is often hindered by the difficulty encountered in deploying suitable landing pads in those areas for supporting the craft upon the ground. Landing of such aircraft in undeveloped areas without the use of a landing pad may be dangerous in that dust and debris may be blown up to damage working parts of the aircraft, particularly where it is required to land repeatedly on dry dusty ground. For example, dust may be drawn into the engine, causing failure thereof, and may cause undue erosion of the rotor blade. Or, in damp areas, the aircraft may sink into relatively soft, moist ground and become mired.

Thus, it has been attempted to develop satisfactory methods of forming prefabricated pad structures wherein the pad can be easily deployed at a remote site, as by dropping it from an aircraft in flight, and preferably without the assistance of ground personnel.

One such method is to suspend a bag-like sheet of material from a supporting aircraft above a desired site, partially fill the bag with a mixture of resin and catalyst pumped into the bag from mixing equipment aboard the aircraft and then drop the bag to the ground, whereupon the plastic mixture spreads over the sheet of material and cures to a relatively hard consistency. While such a method does provide a landing pad deployable from an aircraft without the assistance of ground personnel, it suffers from several limitations. First, separate containers of resin and catalyst are required to be carried aboard the aircraft along with rather complex pumping and mixing apparatus for supplying the correct amounts of each liquid, mixing them together thoroughly to form a self-curing mixture, and then pumping the mixture into the suspended bag. Secondly, the plastic formulation is not spread evenly over the flexible sheet upon impact of the bag with the ground, but is splashed about the sheet and the ground; or, on unlevel ground, the plastic may tend to drain primarily to one side. The result may be that portions of the sheet are covered with a wasteful excess of the plastic formulation while other portions receive less than a desirable amount and do not have the required strength and hardness. Another and more promising method of deploying such a pad has comprised impregnating a fibrous mat with a heat-curable resin mixture prior to its deployment at the site, affixing leaf or sheet spring elements to the mat, rolling or otherwise compacting the mat into a readily transportable bundle, carrying it by high-lift aircraft to the site, and dropping it to the ground, whereupon the spring elements tend to cause the mat to open and spread to a substantially flat configuration on the ground. A layer of a pyrotechnic composition or material is also affixed to the mat and is ignited after the mat falls to the ground for producing heat to cure the resin formulation. While such a method may provide a uniform covering of resin over the entire mat, since the mat or sheet may be thoroughly impregnated prior to its deployment, it also suffers from several difficulties. The metal or hard rubber spring elements used to unroll or unfold the compacted mat add undesirable bulk and weight, such weight becoming a more serious problem when relatively large pads are to be formed. Mats containing such spring elements cannot be folded as readily into a compact bundle as mats not having such spring structures and thus, require more storage space. Further, and particularly with respect to relatively large pads of over 25 to 50 feet in diameter, such spring elements may not be consistently effective in spreading the mats to a flat configuration, and it is sometimes necessary to employ personnel on the ground to complete the deployment and arranging of the mat. The requirement of a pyrotechnic layer to cure the resin is also undesirable, in that it further complicates the manufacture and deployment of the mat; e.g., an ignition means, such as an electrical resistance heater, is required for providing intense heat to ignite the pyrotechnic layer at the site. Further, such intense heat may ignite surrounding foliage in relatively dry areas or otherwise produce smoke which, in combat applications, may be visible to enemy troops.

While the need for a reliable and convenient method of deploying such a pad for use as a landing pad for VTOL/VSTOL aircraft is apparent, such a method is also of utility in other applications such as preparing a pad to support equipment at a remote oil drilling or mining site.

It is, therefore, a major object of the present invention to provide a new and improved method of forming a supporting pad.

Another object is to provide a method of conveniently forming a semi-rigid pad at a remote site.

A further object is to provide such a method wherein the pad may be deployed from an aircraft without the assistance of personnel on the ground and wherein storing, pumping, and mixing apparatus for liquid plastic materials are not required to be carried aboard the aircraft.

Yet another object is to provide such a method wherein the resulting pad is of a consistent thickness and strength throughout.

A still further object is to provide such a method wherein the need for metal or hard rubber spring elements for opening the pad is eliminated.

Another object is the avoidance, in such a method, of the requirement of a pyrotechnic layer and of means for igniting such a layer.

A still further object is to provide a method having the above-stated advantages which, nonetheless, can be simply and inexpensively practiced.

Other objects and advantages will be apparent from the specifications and claims and from the accompanying drawing illustrative of the invention.

In the drawing:

FIG. 1 is a fragmentary, cross-sectional view of a portion of an exemplary mat structure as employed in the invention;

FIG. 2 is a pictorial representation of the mat and of a helicopter employed for transporting the mat to a selected site;

FIG. 3 is a view, similar to FIG. 2, showing the mat suspended over the site during the step of inflating the mat;

FIG. 4 is a pictorial representation of the mat immediately following its release from the aircraft;

FIG. 5 is a perspective, pictorial view showing the mat during the step of inflation of its peripheral tube;

FIG. 6 is a view similar to FIG. 5 and showing the mat following deployment and curing;

FIG. 8 is a cross-sectional view taken in the plane designated by the line VIII—VIII in FIG. 7 and showing portions of the mat constrained within the frame;

FIG. 9 is a perspective, pictorial view of the frame and other associated components as viewed from within the supporting aircraft;

FIG. 10 is a longitudinal, sectional view of an embodiment of a valve employed in the invention; and FIG. 11 is a fragmentary, cross-sectional view of the valve taken in the plane designated by the line XI—XI in FIG. 10.

Figure 7:
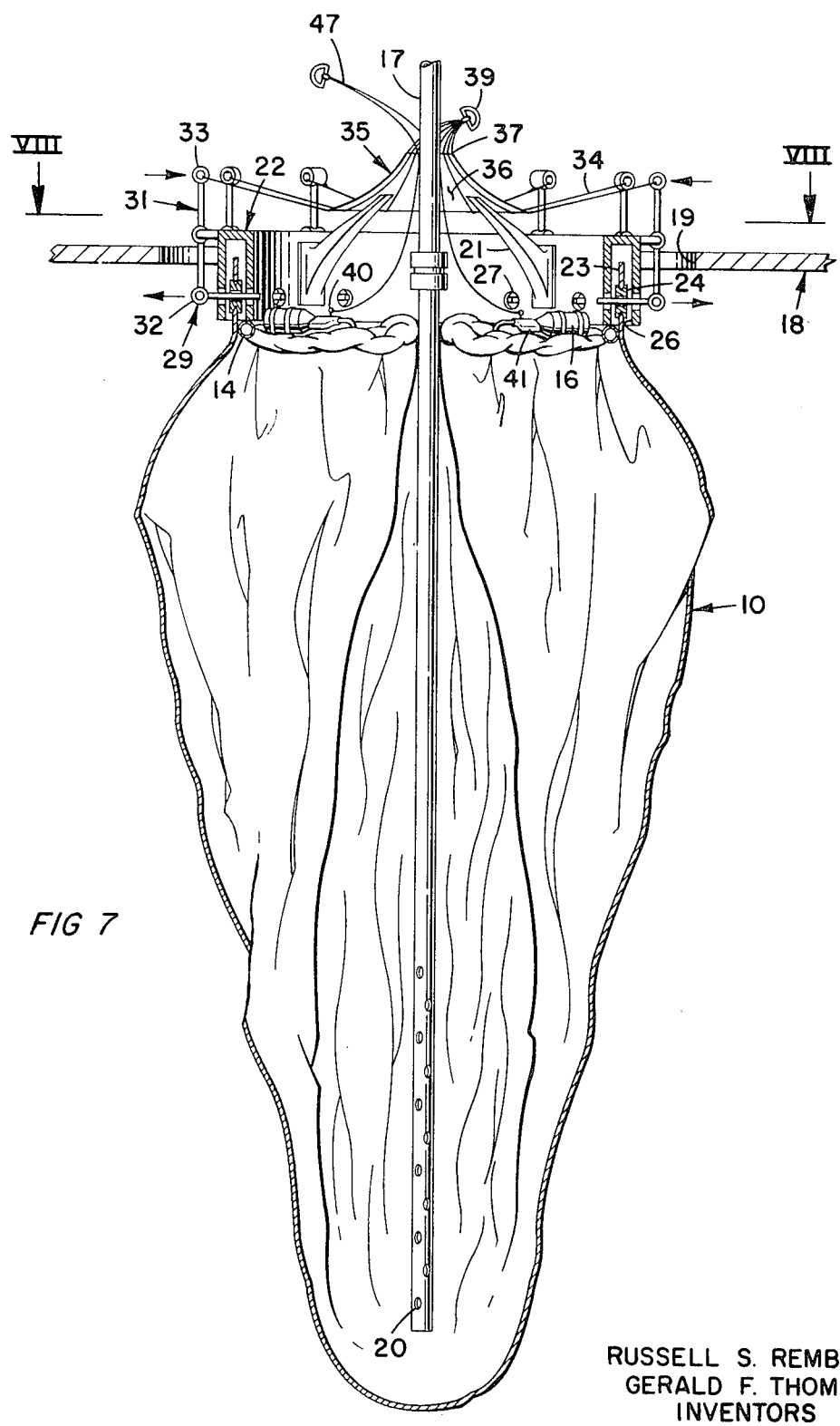
FIG. 7 is a sectional, side view of the compacted mat and of the annular frame employed for gathering and supporting the mat.

While a preferred method, along with modifications thereof, of performing the invention will be described, it will be apparent that other variations and modifications of its steps may be made without departing from the scope of the present invention. Initially, a fibrous mat of the size desired for the finished pad is provided. With reference to FIG. 1, a mat structure 10 of the desired size is formed of a fibrous material of high tensile strength. A preferred material is glass fiber, although other materials, such as polyamide fiber, polyester fiber, or acrylic fiber, may be used. Preferably, the mat structure 10 is comprised of two outer layers 11 of woven glass roving and an inner, center layer 12, comprising a chopped glass fiber mat, bonded between and to the outer layers 11; such a construction combines the high tensile strength of the woven glass roving with the capability of the matted layer 12 to distribute stresses omnidirectionally. Woven roving of approximately 18 ounces per square yard and glass fiber matting of 1.5 ounces per square foot have proven satisfactory, for example, for a mat of approximately 25 to 50 feet in diameter. If, as in the preferred embodiment to be described, a catalyst is used which is activated by exposure to ultraviolet radiation, the mat structure 10 is also provided, on one side, with an opaque layer 13, the opaque layer suitably comprising an opaque film of plastic, e.g., of vinyl, which is bonded by a suitable adhesive to one side of the composite comprising fibrous layers 11, 12.

Referring now ot FIG. 5, the mat structure 10 is preferably of approximately circular configuration and has a flexible, inflatable tube 14 of, for example, approximately 2 inches in diameter affixed thereto and extending peripherally thereof. The peripheral tube 14 is suitably of vulcanized rubber or plastic reinforced with a suitable fabric such as polyamide, e.g., nylon, and is affixed to the mat 10, e.g., by being bonded to the mat with a suitable adhesive and sewn by reinforcing loops of cord (not shown) extending around the tube and through the mat at spaced intervals along the tube. The peripheral tube 14 is continuous or is otherwise closed to permit inflation suitable inlets being provided for connection, respectively, to containers of compressed air 16, as will be more fully described. A plurality of tabs 23 is provided, for reasons which will become apparent, the tabs 23 being affixed to the mat 10 at mutually spaced intervals and extending radially from the mat. As shown more clearly in FIG. 7, each tab 23 is provided with an eyelet or grommet 24 which provides an opening through the tab.

Prior to its deployment, the mat structure 10 is impregnated with a curable plastic formulation, the plastic formulation being of a nature such that the impregnated mat may be transported to the desired site while the resin is in its uncured state, and such that the resin may be cured conveniently after the mat is deployed at the site. A preferred formulation employs a catalyst which is activated by its exposure to ultraviolet radiation such that, upon deployment of the impregnated mat 10 at the site, exposure to ultraviolet radiation from the sun activates the catalyst to effect curing of the mixture. Such a formulation comprises, for example, about 1 to 5% benzoin ($C_6H_5CHOHCOC_6H_5$) mixed with about 95 to 99% polyester resin, e.g., a propyl ester of isophthalic and chlorendic anhydrides cross-linked with a monomer such as styrene. An advantage of such a mixture is that, provided the impregnated mat is shielded from ultraviolet radiation, it may be stored in its uncured form for 48 hours or more without harmful effect, yet, upon exposure to sunlight, it will cure in a few minutes, or for example, in less than 15 to 30 minutes. It has been found that, even on cloudy or overcast days, sufficient radiation is obtained to satisfactorily activate the mixture.

While the sunlight-activated formulation is preferred, other mixtures may also be employed. For example, a resin-catalyst mixture which is curable in a few hours at temperatures encountered at the site is suitable, provided the curing time of the mixture is sufficient to permit transport to and deployment at the site before substantial curing occurs. For example, a mixture of an epoxy resin and a catalyst is suitable, a mixture of 100 parts di-glycidyl ether of bisphenol-A with 14 parts of an aromatic diamine such as metaphenylene diamine, for example, providing a curing time of about 6–10 hours. Or, a polyurethane-based formulation is suitable, e.g., an ester of toluene diisocyanate catalyzed by an aromatic diamine. A suitable catalyst for use with a polyester resin is methyl ethyl ketone peroxide or benzoyl peroxide and the use of a chemical promoter such as cobalt naphthenate and/or N,N,dimethylaniline is also desirable. Particularly if such as self-curing formulation is used, it is preferable that the mat 10 be coated, on at least one side, with a "release agent," i.e., a lubricating material, such as methyl silicone oil or poly tetrafluoroethylene wax, which prevents portions of the impregnated mat from sticking to other, adjacent portions during handling or transport and before deployment. Alternatively, a transparent plastic film such as polyethylene may be used as a separating medium. In place of the resin-catalyst mixtures, solvent evaporating mixtures may be used. Alternatively, a foam-inducing or blowing agent, such as a bicarbonate, is added to a resin-catalyst mixture for inducing foaming of the resin-catalyst mixture during curing to produce a thicker, more resilient pad. Such a mixture is desirably injected between adjacent layers of mat fabric for producing, upon curing, a fabric-foamed plastic-fabric sandwich structure.

While a number of curable plastic formulations are thus suitable, the impregnation of the mat with the curable mixture prior to deployment of the mat is critical to the invention in that it permits a thorough and consistent application of the mixture, since the mixture may be carefully sprayed on the mat, or the mat be dipped in the mixture, under relatively controlled conditions at a conveniently located supply base or depot; thus, the necessity of transporting heavy spraying and mixing apparatus to a remote site is obviated.

Following the step of impregnating the fibrous mat 10 with the curable plastic formulation, the mat is shaped into an easily transportable bundle for facilitating its transport to the desired site. In the preferred method in which an ultraviolet-sensitive catalyst is used, the mat 10 is disposed and shaped such that the plastic formulation is not exposed to ultraviolet radiation prior to depolyment of the mat at the site. Preferably, the mat 10 is folded such that the opaque layer 13 on those portions of the mat disposed at the periphery of the compacted bundle faces outwardly from the bundle for shielding the plastic formulation. As seen most clearly in FIG. 7 and in lesser detail in FIG. 2, the preferred method of shaping the mat comprises shaping it into the form of a deflated, folded balloon, the periphery of the mat being folded and gathered to form an opening into the balloon thus formed, a length of tubing or flexible pipe 17 of plastic or reinforced rubber being inserted within the opening and extending within the balloon for inflating the mat, as will be described. The pipe 17 is preferably of rubberized fabric and is of a diameter, for example, of 5 to 6 inches. A plurality of outlet orifices 20 is suitably provided, the orifices being formed through the wall of the pipe 20 at the lower portion thereof for conducting air into the mat 10. The lower end of the pipe 17 is also open. In the preferred method, the mat 10 is transported to the desired site by a helicopter 18, an opening 19 being formed through the floor of the helicopter for accommodating the gathered, peripheral portion of the mat 10, while the remaining portion of the mat suitably is permitted to hang pendantly from the helicopter.

With reference to FIG. 7, the mat structure 10 is gathered and supported by means of an annular frame 22 which is affixed to the floor of the helicopter 18 and disposed within the opening 19. The annular frame 22 is suitably affixed to the helicopter floor by struts 21 (FIG. 9) which are spaced along the periphery of the frame and extend radially therefrom and over the floor of the aircraft 18, the struts suitably being bolted to the floor and to the annular frame 22. The annular frame 22 is, in cross section, suitably of approximately rectangular configuration and has an annular slot 26 of approximately rectangular cross-sectional configuration cut upwardly from and centrally of the lower surface of the frame, the slot extending continuously along the frame and being adapted to receive the radially extending tabs 23 of the mat. A plurality of bores 27 corresponding to the plurality of tabs 23 is formed through the annular frame 22 and the annular slot 26, the bores being mutually spaced along the frame and extending radially therethrough. Upon the tabs 23 being inserted within the annular slot 26 with their eyelets 24 in register, respectively, with the bores 27, corresponding pins 29 are inserted inwardly through the bores 27 and the eyelets 24 for retaining the tabs 23 within the annular slot 26 and thus attaching the mat 10 to the annular frame 22. The pins 29 must be quickly removable from the bores 27 for releasing the mat 10 from the annular frame 22, and suitable apparatus for removing the pins 29 comprises a plurality of rocker arms 31, each of which is hingedly affixed, at its approximate midpoint, to the frame 22 at a location on the frame directly above a respective bore 27 and upon a pivotal axis tangent to the frame. Each rocker arm 31 has a lower eyelet 32 adapted to loosely engage a corresponding eyelet formed on the adjacent end of the respective, adjacent pin 29 for permitting the pin to be withdrawn from the respective bore 27 upon the rocker arm 31 being rotated such that its lower eyelet is moved outwardly from the frame 22. Alternatively, the lower ends of rocker arm 31 may be connected to the respective, adjacent pins 29 through suitable bearings (not shown) capable of permitting unrestricted pivotal movement of the rocker arms. The bores 27 must be somewhat larger in diameter than the pins 29 to permit the outer ends of the pins to follow the lower eyelets 32 of the rocker arms 31 a slight distance upwardly as the rocker arms are thus rotated. An upper eyelet 33 is formed, respectively, through the upper end of each rocker arm 31, and a respective cable 34 is attached through each upper eyelet. An annular deflecting shield 35 is positioned coaxially above the annular frame 22 and, as shown in FIG. 9, is attached to the frame by means of radially extending struts 38 connected between the frame and the shield. The deflecting shield 35 is of approximately frusto-conical configuration and is positioned with its small end uppermost, a circular opening 37 being formed coaxially through the shield and at its uppermost portion. The deflecting shield 35 has an inner surface 36 having a low coefficient of friction, which surface is suitably coated with a friction-reducing substance such as polytetrafluoroethylene, and, in cross section, preferably has a convex curvature from the top opening 37 to the lower, outer periphery of the shield. The circular opening 37 is of sufficient diameter for allowing passage therethrough of the inflation pipe 17 and the cables 34 from the rocker arms 31, the cables being strung radially inwardly and passed upwardly against the smooth inner surface 36 and through the opening 37 to a convenient handle 39 for permitting the cables to be drawn upwardly from within the aircraft 18 when it is desired to cause the upper eyelets 33 of the rocker arms 31 to be pivoted inwardly.

With added reference to FIG. 8, the annular frame 22 is of a sufficiently small diameter to ensure that the peripheral edge of the mat 10 is gathered and pressed together in a substantially sealed relationship and in a substantially sealed relationship with the flexible pipe 17. The peripheral portions of the mat 10 extending between the tabs 23 (FIG. 7) are sufficiently long, relative to the radius of the frame 22, such that they form inwardly extending folds of material which extend to the pipe 17 or are pressed against other folds which do contact the pipe. To ensure that the periphery of the mat 10 is substantially sealed, the peripheral tube 14 preferably is partially inflated, after the mat 10 has been fastened to the frame 22, to increase the pressure upon the periphery of the mat 10.

Means for inflating the peripheral tube 14 at the site is also provided and, in the present embodiment, comprises a pair of tanks or containers 16 containing air under pressure, the containers being affixed to the peripheral tube by suitable clamps encircling the containers. The containers 16 contain sufficient air under pressure to inflate the peripheral tube 14 to a pressure, for example, of about 15 to 30 p.s.i. An outlet valve 15 is connected, respectively, to each container 16 for controlling the release of air from the container 16, the outlet valves being in communication with the peripheral tube 14 through suitable outlet tubes 46. With reference to FIGS. 10 and 11, the outlet valves 15 are preferably of the quickly releasable type wherein the withdrawal of a pin 40 from a valve member 41 permits the immediate opening of the valve. The valve member 41 (FIG. 10) is linearly slidable within a supporting bushing or sleeve 48, and is normally spaced from a slideable poppet member 43. The poppet member 43 is slideable within a sleeve 42 parallel to and in line with the valve member 41 and is movable from a closed position as shown in FIG. 10, wherein the poppet member 43 is constrained in sealing contact with a valve seat, to an open position. A first spring 44 is mounted below the poppet member 43 such that it urges the poppet member to its closed position, and a second spring 45, more powerful than the first spring, tends to urge the valve member 41 toward the poppet member 43. Upon the withdrawal of the pin 40, the second spring 45 moves the valve member 41 into contact with the poppet member 43, whereupon the relatively stronger, second spring 45 overcomes the first spring 44 to open the valve 15 and allow the passage of air under pressure from the container 16, through the valve 15, and through the outlet tube 46 to the peripheral tube 14. A cable 47 is suitably attached to the pin 40 and extends upwardly, as shown in FIG. 7, from the container 16 and through the opening 37 in the deflecting shield 35. Alternatively, the pin 41 and the pins 29 (FIG. 7) which are inserted through the bores 27 of the annular frame 22 may be removed by means of electrical solenoids affixed to the pins and actuated by the closing of suitable electrical circuits from within the aircraft.

With reference to FIG. 2, upon the mat 10 being thus shaped and compressed within the annular frame 22 aboard the aircraft 18, it is transported to the desired site while hanging pendantly below the aircraft. Alternatively, and particularly if the mat 10 must be transported for a relatively great distance to the site, the mat is further compacted by being folded upon itself and rolled upwardly to form a more compact bundle, the compacted bundle being restrained against the aircraft as by enclosing it in a case (not shown) which is releasably attached to the aircraft 18, the case being dropped when the aircraft reaches the site. Or, the compacted bundel may be carried within the aircraft 18. The inflation pipe 17 is sufficiently flexible to permit folding and rolling of the mat 10. Referring again to FIG. 2, upon reaching the site, the aircraft 18 descends toward the site until the lowermost portion of the mat 10 is a few feet above the ground, and air under pressure is caused to flow downwardly through the pipe 17 (FIG. 7) from a compressor (not shown) or other source of compressed air, e.g., a container of compressed air, aboard the craft 18. Air is conducted downwardly into the lower portion of the gathered mat structure 10 through the plurality of openings 20 and through the open, lower end of the pipe 17 to inflate and expand the mat, as shown in FIG. 3. Only a relatively low pressure, e.g., of approximately one half to two p.s.i., is required to inflate the mat 10, but a sufficiently high volume of air must be supplied to inflate and expand the mat within a matter of a few minutes. This expansion of the mat may be expedited by causing the aircraft 18 to descend such that the mat 10 is pressed against the ground after it has been partially inflated. Because of the high volume and relatively low pressure of the injected air, even if some slight leakage occurs through the gathered periphery of the mat 10, sufficient inflation is normally obtained to satisfactorily expand the mat, in preparation for its deployment at the site, without bringing the mat into contact with the ground.

With continued reference to FIG. 7, the mat 10 is next released from the aircraft 18 by the removal of the pins 29 from the frame 22 and the tabs 23. This is accomplished by exerting an upward force on the handle 39 to pull the cables 34 upwardly against the smooth surface 36 such that they are drawn radially inwardly. The rocker arms 31 are thus caused to rotate such that that the upper eyelets 33 are pulled inwardly and the lower eyelets 32 are moved outwardly from the frame 22 and such that the pins 29 are pulled outwardly from the frame to release the mat 10. The outlet valves 15 of the containers of compressed air 16 are also opened, by exerting an upward force on the cables 47 affixed to the valve pins 40 (FIG. 11), as the pins 29 are withdrawn or immediately thereafter such that, as the mat 10 falls to the ground (FIGS. 4 and 5), the peripheral tube 14 is inflated sufficiently (for example, to approximately 15 to 30 p.s.i.) to stretch the mat 10 to a substantially flat configuration. The opaque layer 13 (FIG. 1) is disposed outwardly of the gathered mat 10 (FIG. 7) such that, upon the release of the mat, the opaque layer comes to rest against the ground and the impregnated layers 11, 12 (FIG. 1) are above the opaque layer and are thus no longer shielded from ultraviolet radiation.

Upon the mat 10 being stretched to a substantially flat configuration upon the site (FIG. 6), its exposure to ultraviolet radiation from the sun activates the catalyst and causes the plastic formulation to cure, as has been discussed. If one of the alternate, self-curing or heat curable resin-catalyst mixtures is employed, the pad will also cure upon the site, but will require a longer curing time of from one to several hours. Upon curing, the resultant pad provides a strong, semi-rigid structure for supporting VTOL/VSTOL aircraft and the like. The peripheral tube 14, also coated by the plastic formulation, remains as a raised, peripheral wall around the pad. The inflation of the mat 10 prior to the step of stretching the mat to a substantially flat configuration by the inflation of the peripheral tube 14 ensures that the mat is substantially unfolded and expanded prior to its release from the annular frame 22; upon its release, inflation of the peripheral tube 14 quickly and positively expands the mat 10 to its flat configuration, as shown in FIG. 6, without the aid of personnel on the ground to further arrange or unfold the mat 10. The inflation of the peripheral tube 14 without the prior step of inflating the mat 10 may not exert a sufficient force to fully deploy the mat. While the step of transporting the mat 10 has been described as preferably being accomplished by an aircraft 18, it is alternately accomplished by the use of other means, such as ground vehicles.

Thus, the present method permits convenient deployment of a pad at a remote site, yet provides a finished pad of consistent strength and thickness, since the plastic formulation is impregnated evenly through the mat 10 prior to its deployment. The mat 10 is positively deployed and expanded at the site by the peripheral tube 14 and, by the inflation of the mat, such that the need for additional personnel on the ground to ensure full deployment is eliminated. Additionally, the need for heavy and cumbersome spring elements affixed to the mat is eliminated, and the requirement of igniting a pyrotechnic layer at the site to cure the mat is obviated, thus rendering the present method simple and inexpensive to perform. Furthermore, the peripheral tube 14 provides an added, useful function by deflecting outwardly flowing gasses upwardly and away from the surrounding ground. That is, the downwash from the aircraft is deflected outwardly by the pad itself and flows partially in a radially outward direction over the peripheral tube, whereupon it is deflected upwardly such that dust or debris immediately surrounding the pad is not greatly disturbed. Thus, the provision of the peripheral tube permits improved protection from dust and debris relative to pads of the same diameter not having such a tube.

It is apparent that other variations and modifications of its steps may be made without departing from the present invention. Accordingly, it should be understood that the forms of the present invention described above and shown in the accompanying drawings are illustrative only and not intended to limit the scope of the invention.

What is claimed is:

1. A method of forming a pad, comprising:
   providing a prefabricated, flexible mat having an inflatable tube affixed peripheraly thereto;
   impregnating the mat with a curable plastic formulation;
   shaping the mat into the form of a deflated, folded balloon, the periphery of the mat being gathered to form an opening into the balloon formed by the mat;
   inserting one end of a tube within the opening;
   transporting the impregnated, shaped mat to a desired site;
   inflating the mat by introducing gas under pressure through the tube and within the mat while constraining the periphery of the mat in substantially sealed relationship with the tube;
   stretching the mat to a substantially flat configuration by releasing the periphery of the mat, and by inflating the peripheral tube while allowing the mat to settle on the desired site; and
   causing the plastic formulation to cure.

2. The method of claim 1, wherein the curable plastic formulation includes a polyester resin.

3. The method of claim 1, wherein the curable plastic formulation includes an epoxy resin.

4. The method of claim 1, wherein the curable plastic formulation comprises a mixture of a methyl ethyl ketone peroxide, a polyester resin, and a chemical promoter.

5. The method of claim 1, wherein the mat comprises alternate layers of woven glass roving and of glass cloth.

6. The method of claim 1, wherein, during the step of inflating the mat, the periphery of the mat is sealingly closed and constrained within an annular frame and releasably affixed to the frame by removable pins which extend within the frame and through eyelets connected to the mat.

7. The method of claim 6, wherein the pins are connected, respectively, to rocker arms which are pivotally connected to the frame upon pivotal axis tangent to the frame and wherein means are provided for pivoting the rocker arms to remove the pins from the eyelets.

8. The method of claim 1, wherein the curable plastic formulation comprises a resin and a catalyst, which catalyst is activated by its exposure to ultraviolet radiation, and wherein the impregnated mat is shielded from ultraviolet radiation prior to the inflation of the peripheral tube.

9. The method of claim 8, wherein the catalyst is benzoin.

10. The method of claim 8, wherein the prefabricated mat is additionally provided, on one side thereof, with an opaque layer of material for shielding the plastic formulation from ultraviolet radiation.

11. The method of claim 10, wherein the step of shaping the mat into an easily transportable bundle includes disposing the mat such that the opaque layer on those portions of the mat disposed at the periphery of the bundle faces outwardly from the bundle for shielding the plastic formulation from ultraviolet radiation.

12. A method of forming a landing pad for a VTOL/VSTOL aircraft, comprising:
providing a prefabricated, flexible mat having an inflatable tube affixed peripherally thereto;
impregnating the mat with a curable plastic formulation;
shaping the mat into the form of a deflated, folded balloon, the periphery of the mat being gathered to form an opening into the balloon formed by the mat;
inserting one end of a tube within the opening;
transporting the impregnated, shaped mat to a desired site by means of a VTOL/VSTOL aircraft;
inflating the mat by introducing gas under pressure through the tube and within the mat while constraining the periphery of the mat in substantially sealed relationship with the tube;
stretching the mat to a substantially flat configuration by releasing the periphery of the mat and by inflating the peripheral tube while allowing the mat to settle on the desired site; and
causing the plastic formulation to cure.

13. The method of claim 11, wherein the inflatable tube is partially filled with gas under pressure prior to the step of inflating the mat.

14. The method of claim 11, wherein the step of inflating the mat is accomplished by introducing the gas from a source of compressed gas aboard the aircraft while the periphery of the mat is connected to the aircraft and the remainder of the mat is allowed to hang pendantly below the aircraft.

15. The method of claim 14, wherein the mat is released from the aircraft prior to the completion of the step of stretching the mat to a substantially flat configuration.

References Cited
UNITED STATES PATENTS

| | | | |
|---|---|---|---|
| 3,346,219 | 10/1967 | Salyer | 244—144 |
| 3,231,644 | 1/1966 | Chang | 264—35 X |
| 3,292,338 | 12/1966 | MacClarence | 264—32 X |
| 3,318,556 | 5/1967 | Vasiloff | 244—114 |
| 3,421,501 | 1/1969 | Beightol | 264—22 X |
| 3,470,991 | 10/1969 | Holcombe | 244—137 X |

ROBERT F. WHITE, Primary Examiner

R. R. KUCIA, Assistant Examiner

U.S. Cl. X.R.

244—114; 264—31, 94, 134, 314